US008855655B2

(12) United States Patent
Gupta et al.

(10) Patent No.: US 8,855,655 B2
(45) Date of Patent: Oct. 7, 2014

(54) METHODS AND APPARATUS FOR SIGNALING PARAMETER DISTRIBUTION FOR NEIGHBORING RADIO FREQUENCIES

(75) Inventors: Binita Gupta, San Diego, CA (US); Krishna Kiran Mukkavilli, San Diego, CA (US); Ashok Mantravadi, San Diego, CA (US); Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1373 days.

(21) Appl. No.: 12/176,376

(22) Filed: Jul. 20, 2008

(65) Prior Publication Data

US 2009/0029709 A1    Jan. 29, 2009

Related U.S. Application Data

(60) Provisional application No. 60/951,056, filed on Jul. 20, 2007.

(51) Int. Cl.
*H04W 40/00* (2009.01)
*H04W 36/00* (2009.01)

(52) U.S. Cl.
USPC .......................................... 455/446; 455/436

(58) Field of Classification Search
USPC ............... 445/446, 450, 436–444, 434, 404.1
See application file for complete search history.

(56) References Cited

U.S. PATENT DOCUMENTS

| 7,421,272 | B2 | 9/2008 | Dalsgaard et al. |
| 7,535,882 | B2 | 5/2009 | Kim |
| 2003/0134622 | A1 | 7/2003 | Hsu et al. |
| 2004/0202140 | A1* | 10/2004 | Kim et al. ..................... 370/335 |
| 2006/0120523 | A1 | 6/2006 | Kurotaki |
| 2006/0153133 | A1* | 7/2006 | Zhong ........................... 370/331 |
| 2007/0010251 | A1* | 1/2007 | Cho et al. ...................... 455/436 |
| 2008/0095122 | A1* | 4/2008 | Khandekar et al. ........... 370/335 |

(Continued)

FOREIGN PATENT DOCUMENTS

| CN | 1551677 A | 12/2004 |
| EP | 1467586 | 10/2004 |

(Continued)

OTHER PUBLICATIONS

International Preliminary Report on Patentability, PCT/US2008/070609, International Examining Authority, European Patent Office, Oct. 13, 2009.

(Continued)

*Primary Examiner* — Michael Faragalla
(74) *Attorney, Agent, or Firm* — Arent Fox LLP (57) ABSTRACT

Methods and apparatus for signaling parameter distribution for neighboring radio frequencies. A method includes identifying selected local operations infrastructures (LOIs) and one or more neighboring LOIs, generating a neighbor description message (NDM) that identifies the selected LOIs and their respective neighbors and specifies SP information for each RF channel associated with the selected LOIs and their respective neighbors, and distributing the NDM over each of the selected LOIs. An apparatus includes a message decoder configured to receive a NDM that identifies RF channels associated with selected LOIs and one or more neighboring LOIs, wherein each RF channel is associated with SP information, and processing logic configured to receive a request to obtain selected SP information associated with a selected RF channel, determine the selected SP information associated with the selected RF channel based on the NDM, and output the selected SP information.

45 Claims, 7 Drawing Sheets

(56) References Cited

U.S. PATENT DOCUMENTS

| | | |
|---|---|---|
| 2008/0253331 A1 | 10/2008 | Gupta et al. |
| 2008/0259858 A1 | 10/2008 | Gupta et al. |
| 2008/0259911 A1 | 10/2008 | Gupta et al. |
| 2008/0261547 A1 | 10/2008 | Gupta et al. |
| 2009/0010225 A1 | 1/2009 | Gupta |
| 2009/0016380 A1 | 1/2009 | Gupta et al. |
| 2009/0080378 A1 | 3/2009 | Gupta et al. |
| 2009/0197604 A1 | 8/2009 | Gupta et al. |
| 2009/0199244 A1 | 8/2009 | Woch et al. |
| 2009/0225872 A1 | 9/2009 | Simon |
| 2009/0274119 A1 | 11/2009 | Gupta et al. |
| 2010/0056166 A1* | 3/2010 | Tenny .................... 455/450 |
| 2011/0038350 A1 | 2/2011 | Gholmieh et al. |
| 2013/0130705 A1 | 5/2013 | Gupta et al. |

FOREIGN PATENT DOCUMENTS

| | | | |
|---|---|---|---|
| EP | 1513368 A2 | 3/2005 | |
| GB | 2407002 | 4/2005 | |
| JP | 2002353915 A | 12/2002 | |
| JP | 2009522947 A | 6/2009 | |
| KR | 20040077725 | 9/2004 | |
| KR | 20040087830 A | 10/2004 | |
| WO | 0232160 A2 | 4/2002 | |
| WO | WO03063418 | 7/2003 | |
| WO | WO03065751 | 8/2003 | |
| WO | WO2005011157 | 2/2005 | |
| WO | WO2005043829 | 5/2005 | |
| WO | WO2005055473 A1 | 6/2005 | |
| WO | WO2005117297 | 12/2005 | |
| WO | WO2006014092 A1 | 2/2006 | |
| WO | WO2006110445 A1 | 10/2006 | |
| WO | WO 2006/134449 * | 12/2006 | ............ H04L 12/18 |
| WO | WO2006134449 A2 | 12/2006 | |

OTHER PUBLICATIONS

ETSI TS 125 331 v7.3.0; "Universal Mobile Telecommunications System (UMTS); Radio Resource Control (RRC); Protocol Specification (3GPP TS 25.331 v7.3.0 Release 7)," 3GPP Technical Specification, pp. 427(line 32)-429(line 57), XP014040018, Section 10.2.16k MBMS Neighbouring Cell p-t-m rb Information, ISSN: 0000-001, Dec. 2006.

UMTS Networks, Architecture, Mobility and Services, pp. 47-50, 55-57, 64, 90, 93 UMTS Networks, Architecture, Mobility and Services, WLEY US, XP002491350.

International Search Report, PCT/US08/070609, International Search Authority, European Patent Office, Nov. 20, 2008.

Written Opinion, PCT/US08/070609, International Search Authority, European Patent Office, Nov. 20, 2008.

Maeda S., "4-5. Multichannel Broadcast Service for Cellular Phones: MediaFLO," Journal of the Institute of Image Information and Television Engineers, Japan, May 1, 2006, vol. 60, No. 5, pp. 725-727.

Maeda, S., "Mobile Communication Technology and Mobile Application Provided by Qualcomm," Japan, Qualcomm Japan Incorporated, Sep. 8, 2006, pp. 18-27, URL, http://www.veriserve.co.jp/jp/seminer/seminer_list/pdf/06.09.08_maeda.pdf.

Qualcomm Proprietary, "MediaFLO", Jul. 26, 2006, URL, http://wiki.nectec.or.th/gitiwiki/pub/Knowledge/PresentationFromICTExpoForum/mediaflo.pdf.

TIA-1099, "Forward Link Only Air Interface Specification for Terrestrial Mobile Multimedia Multicast" Oct. 2006.

Kaaranen, H., et al., "UMTS Networks, Architecture, Mobility and Services, passage" UMTS Networks: Archictecture, Mobility and Services, Wiley, US, Jan. 1, 2001, pp. 47-50, 55-57, 64, 90, XP002491350.

* cited by examiner

FIG. 10

METHODS AND APPARATUS FOR SIGNALING PARAMETER DISTRIBUTION FOR NEIGHBORING RADIO FREQUENCIES

CROSS-REFERENCE TO RELATED APPLICATIONS

The present Application for Patent claims priority to Provisional Application No. 60/951,056 entitled "Method and Apparatus for Supporting System Parameter information for Neighboring Radio Frequencies" filed Jul. 20, 2007, and assigned to the assignee hereof and hereby expressly incorporated by reference herein.

BACKGROUND

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is important for network operators, content retailers, and service providers to have a way to distribute content and/or other network services in a fast and efficient manner and in such a way as to increase bandwidth utilization and power efficiency.

A multi-frequency network (MFN) is a network in which one or more radio frequencies (RFs) (or RF channels) are used to transmit media content. One type of MFN is a horizontal multi-frequency network (HMFN) in which a distribution waveform is transmitted over the same or different RF channels in different local areas. The same or different content may be transmitted as part of the distribution waveform carried over the one or more RF channels in such local areas. Another type of MFN is a vertical MFN in which multiple RF channels are used in a given local area to transmit independent distribution waveforms with an aim to increase the capacity of the network (in terms of the ability to deliver more content to a device/end user). An MFN deployment may comprise a VMFN in certain areas and a HMFN in certain other areas.

In a typical VMFN, a local operations infrastructure (LOI) comprises transmitting sites that operate to transmit multiple distribution waveforms over multiple RF channels in a selected geographic area. Each distribution waveform may comprise one or more content flows that can be selected at a receiving device for rendering. Adjacent LOIs may utilize the same or different RF channels.

Generally, content distribution in an MFN occurs over one or more RF channels that may utilize different signaling parameters (SPs) including physical layer parameters in different LOIs. The SP information describes a variety of transmission characteristics that may be associated with RF channels in the MFN. Thus, the SP information may be different across RF channels carried in the same or different LOIs in an MFN. Therefore, a device attempting to receive content on a particular RF channel would need to utilize the appropriate SP information for that RF channel to receive the content.

Typically, as a device moves from region to region in an MFN, an RF handoff is performed to allow the device to switch between available RF channels that carry desired content flows. These available RF channels may belong to different LOIs, and may utilize different SP information. A device may also perform an RF handoff to another RF in the current LOI to acquire desired content flows. To facilitate handoff, a device may actively monitor RF channels in the current and neighboring regions to determine whether these RF channels can be received with adequate signal strength to perform a handoff. Note that an RF channel determined to have strong signal strength during RF monitoring may not necessarily carry the desired distribution waveform. The knowledge of SP information may improve the effectiveness of RF monitoring by eliminating those RF channels which have strong signal strength but do not carry the desired distribution waveform. Typically, an initialization mechanism is provided to allow a device to tune to a selected RF channel and obtain the SP information associated with that RF channel. The SP information can then be used to determine transmission characteristics of the RF channel in order to receive desired content flows on that RF channel. This process may add additional latency to the RF handoff process. For example, in an MFN having multiple RF channels, it may be necessary for a device to tune to several RF channels to obtain their associated SP information in order to receive desired content flows. Unfortunately, this process is not efficient from a device power consumption perspective and also not desirable from an end user experience perspective.

Therefore, it would be desirable to have a system that operates to allow a device to obtain SP information associated with RF channels in a MFN to facilitate RF channel monitoring and handoff.

BRIEF DESCRIPTION OF THE DRAWINGS

The foregoing aspects described herein will become more readily apparent by reference to the following Description when taken in conjunction with the accompanying drawings wherein.

DETAILED DESCRIPTION OF THE INVENTION

In one or more aspects, a SP distribution system is provided that operates to distribute SP information associated with one or more RF channels in a multi-frequency network. This SP distribution system enables a device to obtain SP information associated with RF channels in current and neighboring LOIs in a fast and efficient manner. The device can utilize the received SP information to monitor RF channels in current and neighboring LOIs in an effective and efficient manner to determine which RF channels with strong signal strength carry a desired waveform and hence are desirable for RF handoff purposes. The device can also utilize the received SP information to receive desired content flows in an efficient manner after performing a handoff to a new RF channel by eliminating additional delays caused by SP information acquisition. In an aspect, the SP distribution system aggregates SP information associated with RF channels belonging to a particular LOI and its neighboring LOIs. The system generates an NDM that comprises the SP information for RF channels belonging to a particular LOI and its neighboring LOIs (or for another selected group of LOIs and their neighboring LOIs) in the multi-frequency network. The NDMs are then distributed to transmitters in respective LOIs, which in turn transmit the NDMs as part of the distribution waveform to devices in their coverage areas.

A device receiving an NDM can determine the set of neighboring LOIs of the current LOI and SP information associated with RF channels available in its current LOI and its neighboring LOIs. Because the NDM provides the SP information associated with RF channels in the current and neighboring LOIs, the device does not have to individually tune to each RF channel to obtain the associated SP information. Thus, by obtaining SP information for neighboring RF channels from the NDM, a device is able to effectively monitor RF channels for RF handoff purposes and efficiently acquire desired content flows after performing a handoff to a new RF. The acquired SP information can be used to achieve a faster and more power efficient RF handoff.

The system is well suited for use in wireless network environments, and may be used in any type of network environment, including but not limited to, communication networks, public networks, such as the Internet, private networks, such as virtual private networks (VPN), local area networks, wide area networks, long haul networks, or any other type of data network.

The following definitions are used herein to describe aspects of a SP distribution system.
1. Local Area—Refers to a local geographic area such as a building, group of buildings, community, city, county or other local region in which services may be broadcast.
2. Wide Area—Refers to a wide geographic area such as a county, state, multiple states, country, multiple countries or other wide region in which services may be broadcast.
3. Multiplex—Refers to a grouping of content flows.
4. Wide Area Multiplex—Refers to a grouping of content flows that are broadcasted over at least one wide area.
5. Local Area Multiplex—Refers to grouping of content flows that are broadcasted over at least one local area.
6. Wide Area Operations Infrastructure (WOI)—Refers to a grouping of transmitters and associated systems that operate to transmit content flows over a wide area. A WOI maps to the smallest geographical wide area which can carry a wide area multiplex. A wide area multiplex may be broadcasted over one or more WOIs.
7. Local Area Operations Infrastructure (LOI)—Refers to a grouping of transmitters and associated systems that operate to transmit content flows over a local area. A LOI maps to the smallest geographical local area which can carry a local area multiplex. A local area multiplex may be broadcasted over one or more LOIs.
8. RF Channel—Refers to an RF frequency that is used to convey a content distribution waveform over a selected LOI.

Figure 1:
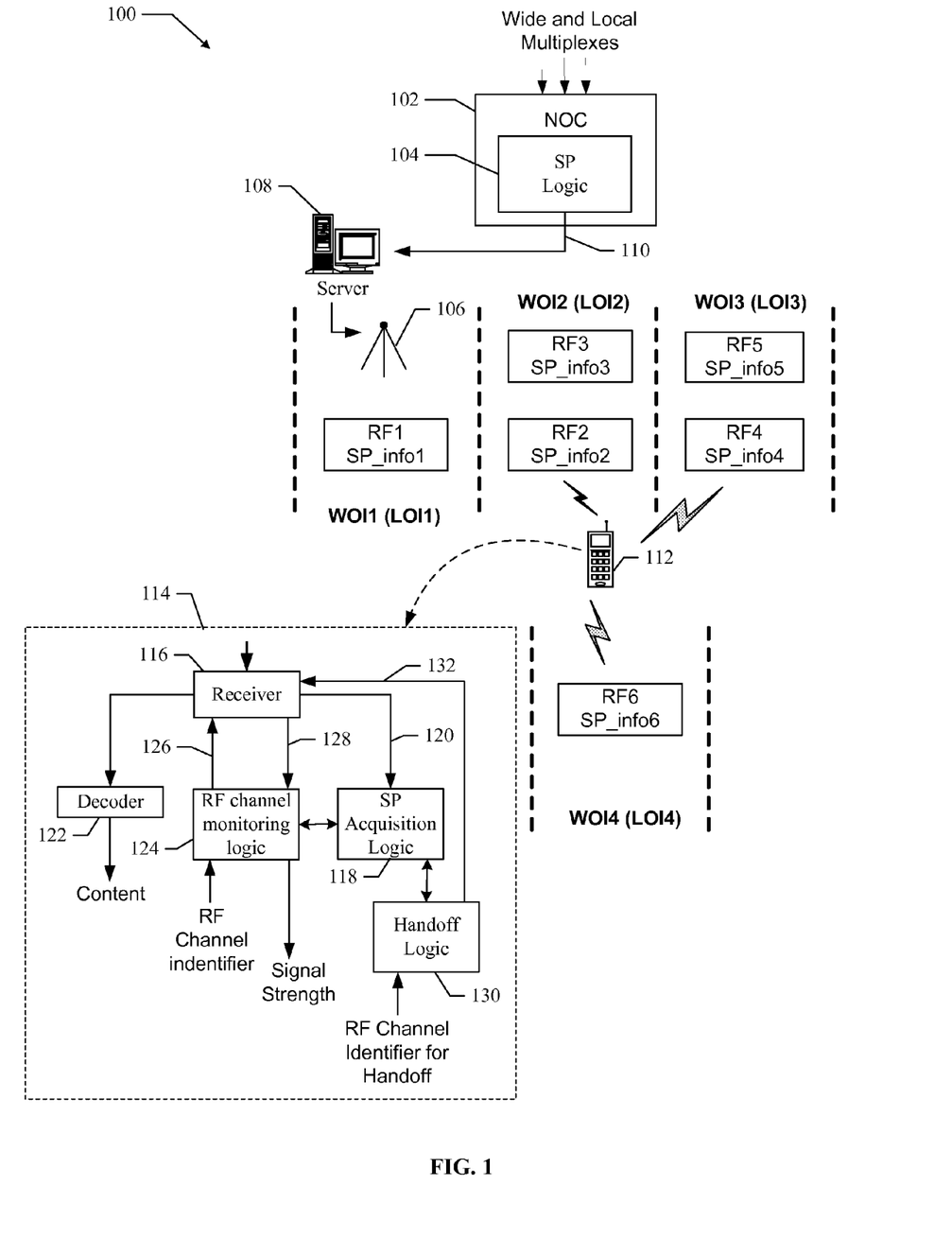
FIG. 1 shows an exemplary network that illustrates how SP information is provisioned in multiple LOIs of an MFN for use in aspects of a SP distribution system.

The following acronyms are used herein to describe aspects of a SP distribution selection system.
LM—Local Area Multiplex
WM—Wide Area Multiplex
NOC—Network Operations Center
LOI—Local Operations Infrastructure
NDM—Neighbor Description Message
SP—Signaling Parameter
FFT—Fast Fourier Transform
OFDM—Orthogonal Frequency Division Multiplexing
WOI—Wide Area Operations Infrastructure FIG. 1 shows an exemplary network 100 that illustrates how SP information is provisioned in multiple LOIs of an MFN for use in aspects of a SP distribution system. For example, the network 100 comprises four WOIs (WOI1, WOI2, WOI3, and WOI4) each comprising one LOI (LOI1, LOI2, LOI3, and LOI4, respectively) of a multi-frequency network. Within each LOI, one or more RF channels are used to transmit content. Each RF channel is associated with SP information that can be used to allow a device to quickly receive a distribution waveform transmitted on that RF channel. LOI1, LOI2, LOI3, and LOI4 are neighboring LOIs as shown in network 100. The LOI1 has LOI2 as its neighbor, the LOI2 has LOI1, LOI3 and LOI4 as its neighbors, the LOI3 has LOI2 as its neighbor and LOI4 has LOI2 as its neighbor.

The network 100 comprises a network operations center (NOC) 102 that operates to receive wide and local content multiplexes for distribution over selected wide and local areas of a multi-frequency network. The NOC 102 also operates to configure the multi-frequency network to distribute that content. To accomplish this, the NOC 102 is aware of the geographic regions of the network that are covered by the LOIs, the RF channels used in each region, and any other network information that may be needed to configure the network and distribute the wide and local area content multiplexes. It should be noted that the network 100 may comprise any number of LOIs.

In an aspect, the NOC 102 comprises SP logic 104. The SP logic 104 operates to aggregate SP information associated with RF channels in each LOI and its neighboring LOIs in the MFN. In an aspect, the SP logic 104 operates to generate NDM messages that are configured to provide a list of neighboring LOIs associated with a particular LOI and SP information associated with RF channels of the particular LOI and its neighboring LOIs. In another aspect, the NDM messages are configured to provide a list of neighboring LOIs and SP information associated with RF channels for any selected group of LOIs. A more detailed description of the NDM messages generated by the SP logic 104 is provided in another section of this document.

The NOC 102 operates to transmit the wide and local area multiplexes and the generated NDMs to the LOIs in the network 100. It should be noted that although only four LOIs are shown, the NOC 102 may transmit the multiplexes and associated NDMs to any number of LOIs.

In an aspect, the LOI1, LOI2, LOI3, and LOI4 comprise one or more transmitter sites. For example, the LOI1 comprises transmitter site 106. Each transmitter site operates to transmit a distribution waveform on a selected RF channel over its respective LOI. It should be noted that each transmitter site comprises one or more servers as illustrated at 108.

In an aspect, the NOC 102 operates to transmit the content multiplexes and the NDMs to the transmitter sites using any suitable transport mechanism. For example, the content multiplexes and the NDMs are transmitted to servers associated with each transmitter site, as illustrated at 110. In an aspect, the NOC 102 transmits the content multiplexes and the NDM messages to the transmitter sites using an MPEG-2 transport mechanism. In this configuration, the multiplexes and NDM messages are assigned MPEG-2 transport identifiers so that servers at each transmitter site can detect and receive selected content multiplexes and an NDM message which are directed to them, respectively.

The servers at the transmitter sites use the transport identifiers to determine which multiplexes and NDM message are intended for them to distribute over their respective LOIs. The servers then operate to pack their respective multiplexes and the NDM message into transmission frames for transmission over selected RF channels. The servers utilize any suitable physical layer process to pack the multiplexes and the NDM message into the transmission frames for transmission. By using the transport identifiers to determine the multiplexes and the NDM message intended for transmission over their respective LOIs, the servers at the transmitter sites need not decode any of the multiplexes or NDM messages. The servers simply detect the appropriate transport identifiers and then pack the identified multiplexes and the NDM message into the transmission frames according to the physical layer process.

The transmission frames comprise content flows associated with the wide and local area multiplexes and the NDM message generated by the SP logic 104. In an aspect, the transmission frames comprise wide and local area data partitions that are used to convey the wide and local area content flows, respectively. In addition, the wide and local partitions comprise wide and local area control channels. In an aspect, the local area control channel is used to distribute the NDM message generated by the SP logic 104 to the devices in each LOI.

In an aspect, the transmitter sites transmit transmission frames over their respective LOIs using the designated RF channels. By using multiple RF channels, the network 100 is able to transmit more content flows over such LOIs. It should be noted that the transmitter sites within a LOI may be co-located or separated by any desired distance. It should also be noted that the NDMs distributed over each LOI may be different because each LOI may have a different set of neighbor LOIs and each neighbor may be associated with different RF channels and descrambling sequences with which to descramble the transmitted content.

A device 112 operating in the LOI2 is tuned to receive a distribution waveform on channel RF2. Details of the device 112 are shown at 114. The device 112 comprises a receiver 116 that operates to tune to a selected RF channel to receive a distribution waveform that comprises a sequence of transmission frames. The transmission frames that are received comprise a local control channel that conveys an NDM generated by the SP logic 104 for distribution in LOI2. The NDM comprises the list of neighboring LOIs for the current LOI (i.e. LOI2) and SP information associated with RF channels in the current LOI (i.e., LOI2) and its neighboring LOIs (i.e., LOI1, LOI3 and LOI4).

The receiver 116 passes the received NDM to SP acquisition logic 118, as illustrated at 120. The receiver 116 also descrambles the received content associated with RF2 in LOI2 and passes the descrambled content to a decoder 122 that operates to render the content for the device user.

The SP acquisition logic 118 operates to receive the NDM, which identifies a list of neighboring LOIs for a given LOI (i.e., LOI2) and SP information associated with RF channels in the given LOI and its neighboring LOIs. From this information, the SP acquisition logic 118 operates to store the mappings between RF channels and SP information used in the current LOI and each neighboring LOI of the current LOI.

In an aspect, RF channel monitoring logic 124 receives an RF channel indicator that indicates a selected RF channel to be monitored. For example, the signal strength of the selected RF channel is to be determined. The RF channel monitoring logic 124 operates to obtain the appropriate SP information associated with the selected RF channel from the SP acquisition logic 118, and passes these parameters to the receiver 116 as shown at 126. The receiver 116 operates to monitor the strength of the selected RF channel using received SP information and passes a signal strength indicator 128 to the RF channel monitoring logic 124. The RF channel monitoring logic 124 then passes the signal strength indicator for the selected RF channel to other logic at the receiving device 112. For example, handoff logic 130 at the receiving device 112 may provide several RF channel indicators to the RF channel monitoring logic 124 so that the signal strength of each RF channel can be monitored for handoff purposes.

The handoff logic 130 receives an RF channel indicator to perform a handoff to a selected RF for receiving desired content. The handoff logic 130 operates to obtain the appropriate SP information associated with the selected RF channel from the SP acquisition logic 118, and passes these parameters to the receiver 116 as shown at 132. The receiver 116 operates to acquire the desired content on the selected RF channel using the received SP information.

Thus, the SP distribution system operates to perform one or more of the following functions to distribute SP information in a multi-frequency network.

1. Determine the configuration of a multi-frequency network.
2. Determine SP information associated with RF channels of the multi-frequency network.
3. Generate NDM messages that are configured to provide a list of neighboring LOIs associated with a particular LOI and SP information associated with RF channels of the particular LOI and its neighboring LOIs.
4. Distribute the NDM messages over the multi-frequency network.

Additionally, the SP distribution system operates to perform one or more of the following functions to acquire SP information in a multi-frequency network.

1. Obtain (from information in a received NDM) a list of available RF channels in current and neighboring LOIs.
2. Obtain (from information in a received NDM) SP information associated with the list of available RF channels in the current and neighboring LOIs.
3. Receive one or more RF channel identifiers for performing RF monitoring, RF handoff or some other function.
4. Obtain the appropriate SP information for the one or more RF channel identifiers.
5. Output the SP information to the requesting logic.
6. The requesting logic then utilizes the SP information for the one or more RF channel identifiers to perform RF monitoring, RF handoff, or some other function.

Therefore, in various aspects, the SP distribution system (in the example illustrated in FIG. 1 comprising the SP logic 104 and SP acquisition logic 118) operates to assemble a NDM that comprises a given LOI and its neighboring LOIs and the associated SP information for distribution in a multi-frequency network. Devices receiving the NDM can obtain SP information associated with RF channels in current and neighboring LOIs and use the SP information to effectively monitor selected RF channels and perform RF handoff in an efficient manner.

Figure 2:
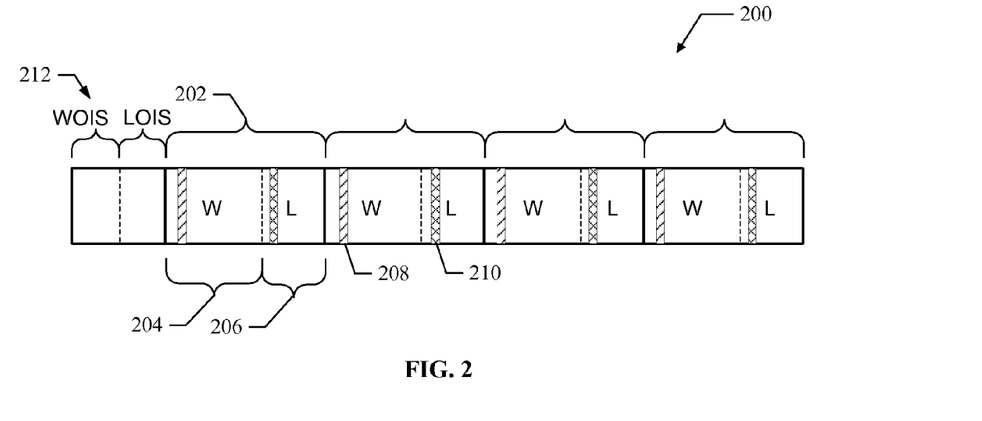
FIG. 2 shows a diagram of an exemplary transmission frame for use in aspects of a SP distribution system.

FIG. 2 shows a diagram of an exemplary transmission frame 200 for use in aspects of a SP distribution system. For example, the transmission frame 200 may be packed with wide and local area content multiplexes and an NDM message. The transmission frame 200 may be transmitted by one or more of the transmitter sites shown in FIG. 1.

The transmission frame 200 comprises four sub-frames, shown generally at 202, that are used to convey wide and local area content multiplexes. For example, each sub-frame 202 comprises a wide area partition 204 that is packed with wide area content multiplexes, and a local area partition 206 that is packed with local area content multiplexes.

Included in the wide area partition 204 is a wide area control channel 208. The wide area control channel 208 operates to convey messages pertaining to the wide area content multiplex. Included in the local area partition 206 is a local area control channel 210. The local area control channel 210 operates to convey messages pertaining to the local area content multiplex. In an aspect, the local area control channel is used to convey an NDM message comprising SP information as described herein.

At the start of the transmission frame 200 are overhead information symbols (OIS) 212 that provide overhead information that is used to locate the wide area control channel, the local area control channel, and the wide and local area content multiplexes that are packed into the sub-frames 202. The OIS 212 comprises wide overhead information symbols (WOIS) and local overhead information symbols (LOIS).

Figure 3:
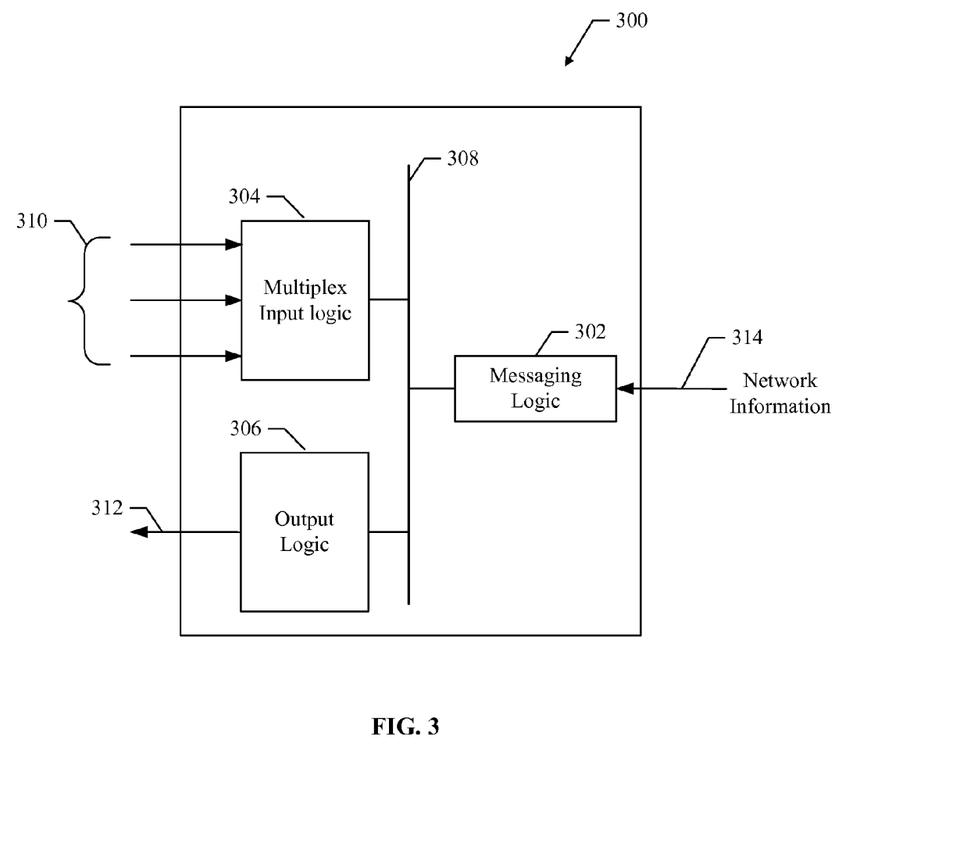
FIG. 3 shows exemplary SP logic for use in aspect of a SP distribution system.

FIG. 3 shows exemplary SP logic 300 for use in aspect of a SP distribution system. For example, the SP logic 300 is suitable for use as the SP logic 104 shown in FIG. 1. The SP logic 300 comprises messaging logic 302, multiplex input logic 304, and output logic 306 all coupled to a data bus 308.

The multiplex input logic 304 comprises at least one of a CPU, processor, gate array, hardware logic, memory elements, and/or hardware executing software. The multiplex input logic 304 operates to receive one or more wide and/or local area multiplexes 310 that are to be distributed over wide and local regions of a multi-frequency distribution network.

The messaging logic 302 comprises at least one of a CPU, processor, gate array, hardware logic, memory elements, and/or hardware executing software. The messaging logic 302 operates to generate messages for use in aspects of the SP distribution system. The messaging logic 302 has access to the neighboring relationship information among LOIs in the multi-frequency distribution network. For example, the messaging logic 302 receives network information 314 from the NOC 102. In an aspect, the messaging logic 302 generates one or more NDM messages that identify one or more neighboring LOIs for a given LOI and SP information associated with RF channels used in the given LOI and its neighboring LOIs. In another aspect, the messaging logic 302 generates an NDM message for any selected group of LOIs. A more detailed description of the NDM message is provided in another section of this document.

The output logic 306 comprises at least one of a CPU, processor, gate array, hardware logic, memory elements, and/or hardware executing software. The output logic 306 operates to output content multiplexes and NDM messages (shown at 312) for distribution to LOIs in a multi-frequency network. For example, the output logic 306 operates to output the received content multiplexes 310 and NDM messages generated by the messaging logic 302 to transmitter sites in a multi-frequency network using any type of transport mechanism.

In an aspect, the SP distribution system comprises a computer program product having one or more program instructions ("instructions") or sets of "codes" embodied or stored on a machine-readable medium. When the codes are executed by at least one processor, for instance, a processor at the messaging logic 302, the codes cause the processor to provide the functions described herein. For example, the sets of codes may be embodied on a machine-readable medium, such as a floppy disk, CDROM, memory card, FLASH memory device, RAM, ROM, or any other type of memory device or machine-readable medium that interfaces to the SP logic 300. In another aspect, the sets of codes may be downloaded into the SP logic 300 from an external device or network resource. The sets of codes, when executed, provide aspects of a SP distribution system as described herein.

Figure 4:
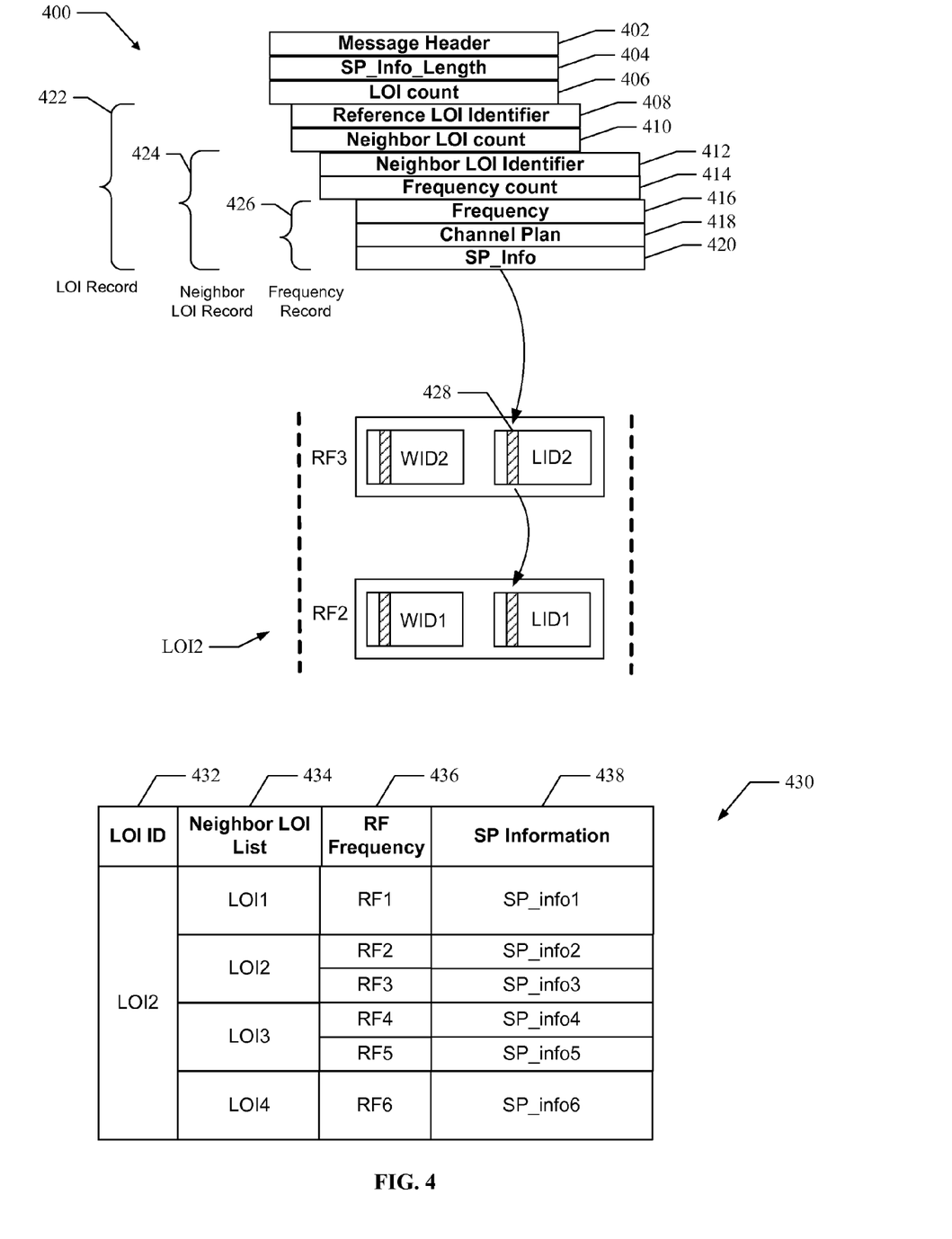
FIG. 4 shows a diagram that illustrates an exemplary neighbor description message for use in aspects of a SP distribution system.

FIG. 4 shows a diagram that illustrates an exemplary neighbor description message 400 for use in aspects of a SP distribution system. For example, the NDM 400 is generated by the messaging logic 302 shown in FIG. 3.

In an aspect, the NDM 400 is generated separately for each LOI and is configured to provide a list of RF channels associated with a selected LOI and its neighboring LOIs. In another aspect, the NDM 400 is generated for a selected group of LOIs (which may or may not be neighbors), and includes all neighboring LOIs for each of the LOI within the selected group of LOIs. Each of the RF channels described in the NDM 400 is associated with its own SP information. The following is a description of the parameters included in the NDM 400.

The NDM 400 comprises a message header 402 which identifies the NDM message 400. The NDM 400 also comprises a SP information length indicator (SP_Info_Length) 404 that indicates the length (in bits) of a SP information (SP_Info) field provided in the NDM 400. In an aspect, the SP_Info_Length indicator 404 is a global indicator that specifies length in an integer number of bits for the SP_info field 420 for every RF included in the NDM 400. Thus, in this aspect the SP_info 420 is specified using the same number of bits for all RFs in the NDM.

The NDM 400 also comprises a LOI count parameter 406 that indicates the number of LOIs for which a set of neighboring LOIs, associated RF channels, and associated SP information is described in the NDM 400. For each LOI count 406, a LOI record 422 is included containing the group of parameters as indicated by the bracket. For example, if the LOI count parameter 406 is equal to "2", there will be two sets of LOI records 422.

As part of the LOI record 422, a Reference LOI identifier parameter 408 is provided that identifies a particular reference LOI. A neighbor LOI count parameter 410 is provided that indicates the total number of neighboring LOIs associated with the reference LOI plus the reference LOI itself. For each neighbor LOI count 410, a Neighbor LOI record 424 is included containing the group of parameters as indicated by the bracket. For example, if the neighbor LOI count parameter 410 is equal to "2", there will be two sets of Neighbor LOI records 424. The Neighbor LOI record 424 provides RF channels and SP information associated with a given LOI.

As part of the Neighbor LOI record 424, a Neighbor LOI Identifier 412 is provided that identifies the particular LOI for which information is being described in the Neighbor LOI Record 424. A frequency count parameter 414 is provided that indicates how many frequencies (i.e., RF channels) are associated with the identified LOI. For each RF channel in the identified LOI, a Frequency record 426 is included containing the group of parameters as indicated by the bracket. For example, if the Frequency count parameter 414 is equal to "2", there will be two sets of Frequency records 426.

As part of the Frequency record 426, a frequency parameter 416 is provided that indicates a particular transmission frequency. A channel plan parameter 418 is provided that indicates channel bandwidth for the particular transmission frequency. A SP_info field 420 is provided that describes signaling parameters (including physical layer parameters) associated with a particular transmission frequency.

As illustrated in FIG. 4, the NDM 400 is distributed over the LOI2 using a local control channel 428 that is part of the transmission frames transmitted by the RF channels in LOI2. It should be noted that the NDM 400 may be formatted in any suitable format, encoded or encrypted, and/or reorganized or divided into two or more message components.

A table 430 is shown that illustrates how parameters provided in the NDM 400 may be organized and stored at SP acquisition logic 118 located at a device 112. The table 430 comprises a LOI identifier 432 that identifies the device's current LOI (i.e., LOI2). The table 430 also includes a Neighbor LOI List 434 that identifies neighboring LOIs of the device's current LOI plus the current LOI itself.

The table 430 also comprises RF Frequency identifiers 436 that identify RF frequencies associated with each LOI identified in the Neighbor LOI List 434. The table 430 also comprises SP information 438 that provides SP_info associated with each RF Frequency 436. Thus, the table 430 may be generated by SP acquisition logic 118 and stored at a receiving device 112 for use during RF channel monitoring and RF handoff.

Figure 5:
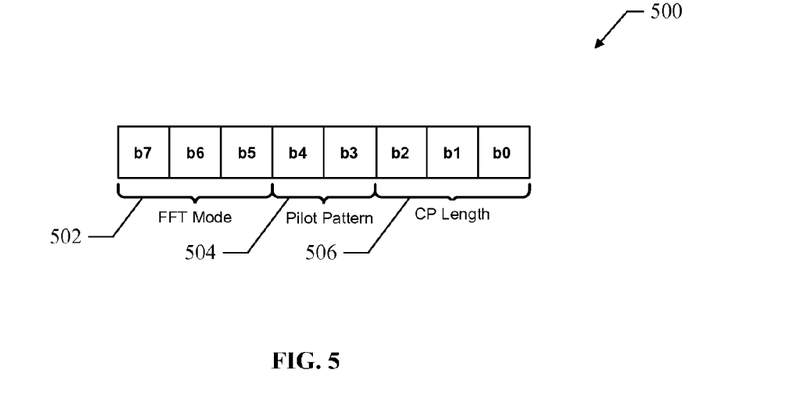
FIG. 5 shows exemplary SP_info for use in aspects of a SP distribution system

FIG. 5 shows exemplary SP_info 500 for use in aspects of a SP distribution system. For example, the SP_info 500 may be received in a NDM as illustrated at 420 and stored for each RF channel shown in the table 430. In an aspect, the SP_info 500 comprises the following information.

1. FFT_Mode (502): Specifies a physical layer FFT mode used for OFDM on a RF transmission frequency (3-bits).
2. Pilot_Pattern (504): Specifies physical layer pilot pattern used for a RF transmission frequency (2-bits).
3. CP_Length (506): Specifies physical layer cyclic prefix length used for a RF transmission frequency (3-bits).

In an aspect, the SP_info 500 has a size of 8 bits. However, the SP_info can be extended up to 16 bits or larger. In an aspect, the SP_Info_Length field 404 is five bits to support 16 bit SP_info fields. In an aspect, the SP_info field 404 is always set to maximum size for each RF channel included in the NDM. In this case, the NDM message does not need to have an SP_Info_Length field 404. It should be noted that the SP_info 500 is not limited to the signaling parameters shown and that the SP_info 500 may comprise additional signaling parameters or any other type of signaling parameters than those described above.

In an aspect, only a subset of the SP information may be different for RF channels within a network. For example, the FFT Mode may be the same for all RF channels in the network but the CP Length may be different for these RF channels. In an aspect, only partial SP information can be sent for RF channels in an MFN network. For example, the SP_info can be shortened to three or five bits to send only the following information.

1. 3-Bit SP_info: Includes only CP Length
2. 5-Bit SP_info: Includes only CP Length and Pilot Pattern In an aspect, a receiving device should interpret an SP_Info_Length of 3-bits or 5-bits such that the device uses default values for parameter information that is not included in the SP_info. Thus, in an aspect the SP_Info_Length can take one of the following values [0, 3, 5, 8 or larger] depending upon SP_info that is transmitted.

In an aspect, the SP_Info_Length will be set to zero (0) if no SP_info is being transmitted. This may happen if the entire network is using default SP information that is pre-configured on receiving devices. If the SP_Info_Length set to 0, a receiving device uses a default configured value for SP information associated with all neighboring RFs.

Figure 6:
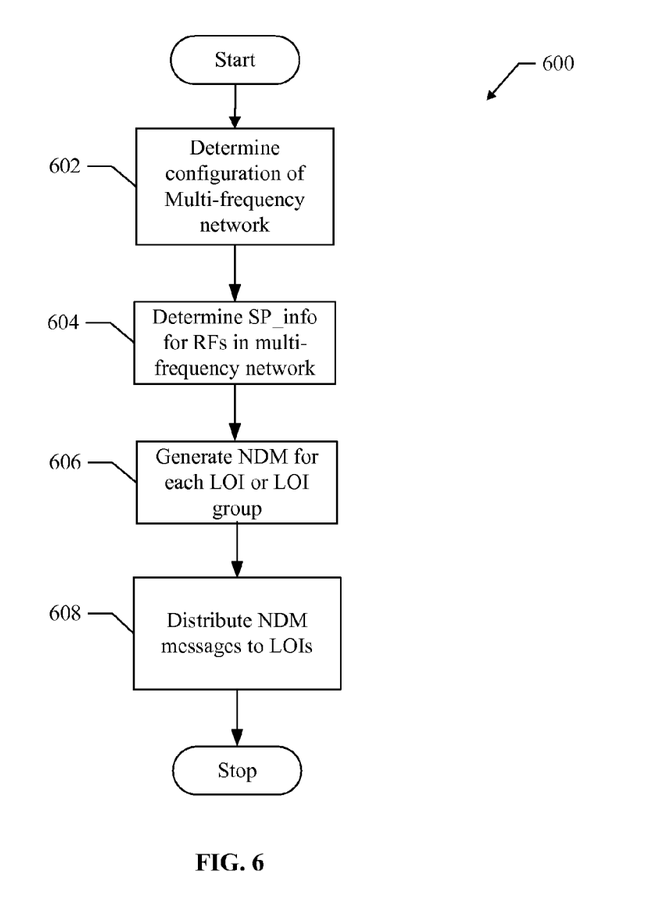
FIG. 6 shows an exemplary method for generating neighbor description messages for use in aspects of a SP distribution system.

FIG. 6 shows an exemplary method 600 for generating neighbor description messages for use in aspects of a SP distribution system. For clarity, the method 600 is described herein with reference to the SP logic 300 shown in FIG. 3. For example, in an aspect, the messaging logic 302 executes one or more sets of codes to control the SP logic 300 to perform the functions described below.

At block 602, the configuration of a multi-frequency network is determined. For example, the NOC 102 determines the distribution of the wide area and local area multiplexes to selected WOIs and LOIs. In an aspect, the NOC 102 determines which multiplexes are to be delivered to each LOI and the RF channels that are to be used to deliver the multiplexes within each LOI.

At block 604, SP_info is determined for each RF channel. For example, the messaging logic 302 determines SP_info for RF channels in the multi-frequency network from network information received from the NOC 102.

At block 606, NDM messages are generated for each LOI. For example, in an aspect, for each LOI in the distribution network, an NDM is generated that identifies the set of neighboring LOIs for that LOI and provides SP_info for RF channels in that LOI and its neighboring LOIs. In another aspect, an NDM message is generated for any selected group of LOIs. For example, the messaging logic 302 operates to generate the NDM messages, which may be formatted as the NDM 400 illustrated in FIG. 4.

At block 608, the content multiplexes and NDM messages are distributed to transmitter sites for distribution to devices in each LOI. For example, the content multiplexes and NDM messages are transmitted to the transmitters using any suitable transport mechanism. From the transmitter sites the NDM messages are distributed over each LOI in the local control channel portion of the transmission frames as illustrated in FIG. 2.

Thus, the method 600 operates to generate NDM messages for use in aspects of a SP distribution system. It should be noted that the method 600 represents just one implementation and that other implementations are possible within the scope of the aspects.

Figure 7:
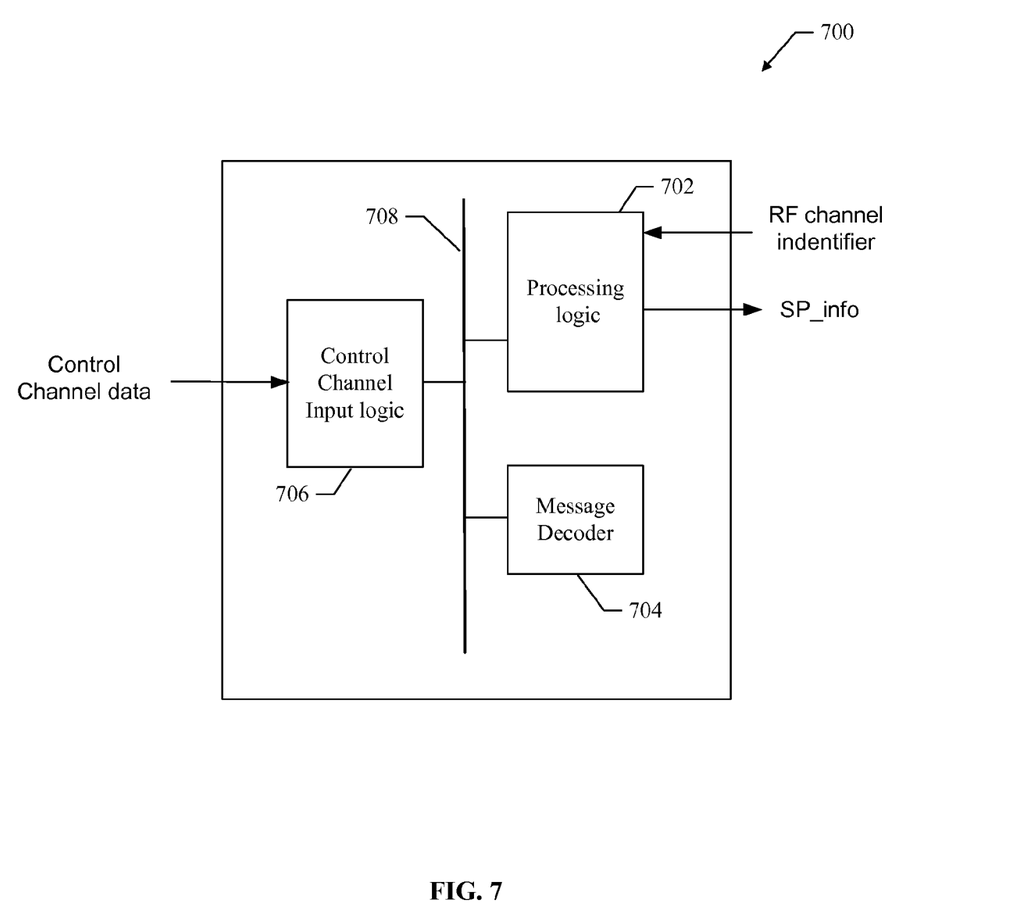
FIG. 7 shows exemplary SP acquisition logic for use in aspects of a SP distribution system.

FIG. 7 shows exemplary SP acquisition logic 700 for use in aspects of a SP distribution system. For example, the SP acquisition logic 700 is suitable for use as the SP acquisition logic 118 shown in FIG. 1. The SP acquisition logic 700 comprises processing logic 702, message decoder 704, and control channel input logic 706 all coupled to a data bus 708.

The control channel input logic 706 comprises at least one of a CPU, processor, gate array, hardware logic, memory elements, and/or hardware executing software. The control channel input logic 706 operates to receive control channel data over an RF channel that a device is currently tuned to and passes this data to the message decoder 704. For example, an NDM message is received over a local control channel that is part of a transmission frame as illustrated in FIG. 2.

The message decoder 704 comprises at least one of a CPU, processor, gate array, hardware logic, memory elements, and/or hardware executing software. In an aspect, the message decoder 704 operates to decode an NDM message received over the control channel. For example, the message decoder 704 operates to decode the received NDM message to determine SP_info associated with RF channels in the current LOI and its neighboring LOIs. For example, the NDM message is formatted as illustrated in FIG. 4 and is decoded to determine the SP_info associated with RF channels in the current LOI and its neighbor LOIs. In an aspect, a table of RF channels and associated SP information is maintained and stored as illustrated by table 430. This information is passed to the processing logic 702.

The processing logic 702 comprises at least one of a CPU, processor, gate array, hardware logic, memory elements, and/or hardware executing software. In an aspect, the processing logic 702 operates to receive an RF channel identifier which identifies a selected RF channel. In an aspect, the processing logic 702 is configured to receive the RF channel identifier from the RF channel monitoring logic 124 shown in FIG. 1 for monitoring signal strength of the selected RF channel. In another aspect, the processing logic 702 is configured to receive the RF channel identifier from the handoff logic 130 shown in FIG. 1 for performing a handoff to the selected RF channel. The processing logic 702 obtains the SP_info for the selected RF channel from the received NDM. The processing logic 702 then outputs the SP_info to the RF channel monitoring logic 124, which operates to use the SP_info to effectively monitor the signal strength of the selected RF channel. For example, the signal strength of the selected RF channel may be provided to the handoff logic 130 operating at the device for the purpose of facilitating an RF handoff. The processing logic 702 also outputs the SP_info to the handoff logic 130, which operates to use the SP_info to acquire desired content on the selected RF channel.

In an aspect, the SP distribution system comprises a computer program product having one or more program instructions ("instructions") or sets of "codes" stored on a machine-readable medium. When the codes are executed by at least one processor, for instance, a processor at the processing logic 702, the codes cause the processor to provide the functions described herein. For example, the sets of codes may be loaded into the SP acquisition logic 700 from a machine-readable medium, such as a floppy disk, CDROM, memory card, FLASH memory device, RAM, ROM, or any other type of memory device or machine-readable medium that interfaces to the SP acquisition logic 700. In another aspect, the sets of codes may be downloaded into the SP acquisition logic 700 from an external device or network resource. The sets of codes, when executed, cause a processor to provide aspects of a SP distribution system as described herein.

Figure 8:
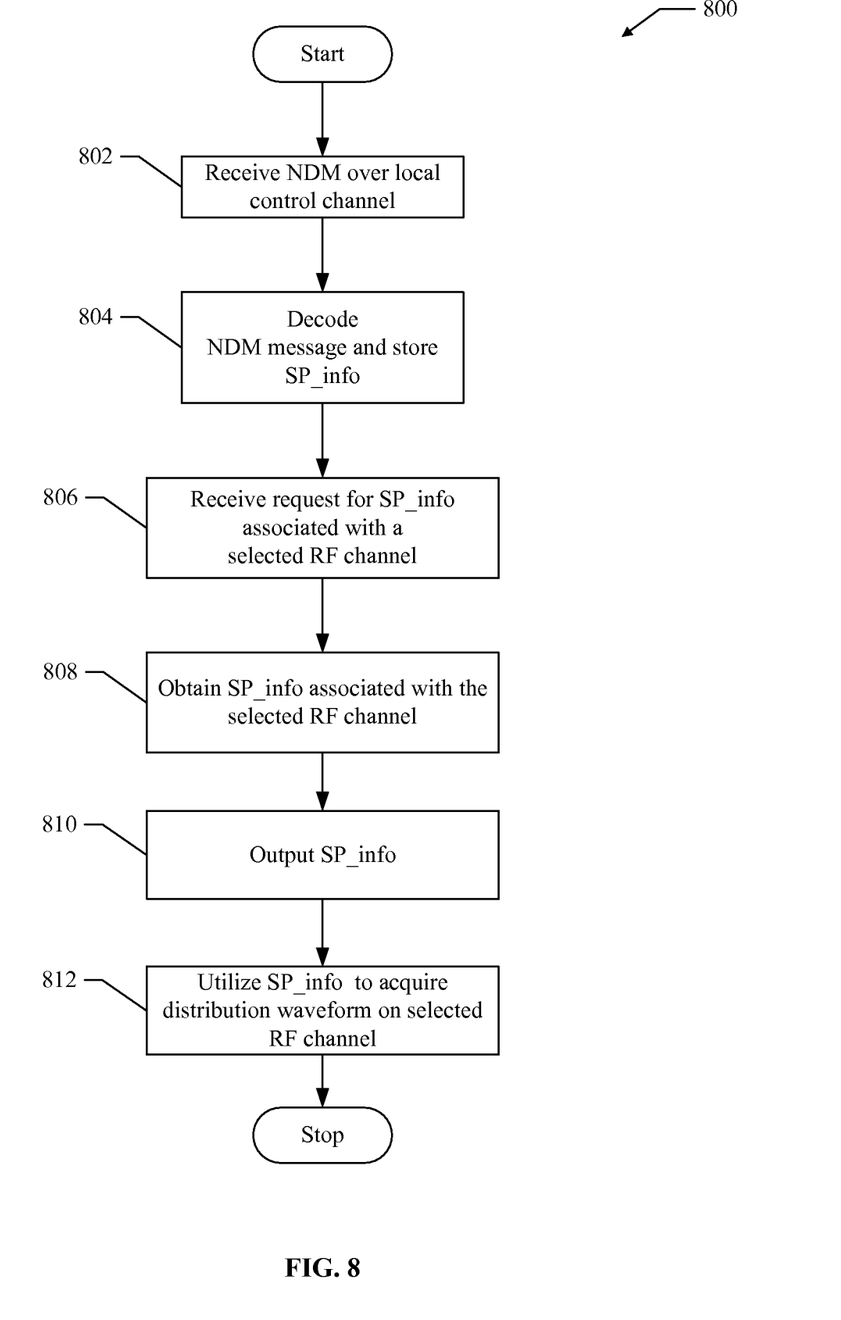
FIG. 8 shows an exemplary method for acquiring SP information associated with RF channels in an MFN for use in aspects of a SP distribution system.

FIG. 8 shows an exemplary method 800 for acquiring SP information associated with RF channels in an MFN for use in aspects of a SP distribution system. For clarity, the method 800 is described herein with reference to the SP acquisition logic 700 shown in FIG. 7. For example, in an aspect, the processing logic 702 executes one or more sets of codes to control the SP acquisition logic 700 to perform the functions described below.

At block 802, a NDM is received over a local control channel. In an aspect, the local control channel data is received by the control channel input logic 706. For example, local control channel data is received at a device in a sequence of transmission frames that are formatted as illustrated in FIG. 2.

At block 804, a received NDM message is decoded and SP information is stored. In an aspect, the NDM message is formatted as illustrated in FIG. 4. The NDM message identifies the set of neighboring LOIs for the current LOI and associates RF channels with SP information for the current LOI and its neighboring LOIs. In an aspect, the information in the NDM message is decoded by the message decoder 704 and stored at the device in a table as illustrated by table 430.

At block 806, a request is received for SP_info associated with a selected RF channel. In an aspect, the request is received by the processing logic 702. For example, the request may be received from the RF channel monitoring logic 124 or the handoff logic 130 shown in FIG. 1.

At block 808, SP_info associated with the selected RF channel is obtained from the information received in the NDM. In an aspect, the processing logic 702 determines the SP_info associated with the selected RF channel from a table that maps RF channels of the current LOI and neighboring LOIs to SP information.

At block 810, the SP_info associated with the selected RF channel is output. For example, in an aspect, the SP_info is output by the processing logic 702 to the RF monitoring logic 124 or the RF handoff logic 130 shown in FIG. 1.

At block 812, the SP_info is utilized to acquire a distribution waveform on the selected RF. For example, the SP_info is used by the RF channel monitoring logic 124 to effectively monitor the selected RF channel to facilitate a device handoff. In an aspect, the FFT mode indicator and the cyclic prefix length indicator can be used to determine the OFDM symbol boundaries on the selected RF. The OFDM symbol boundaries can then be used to perform cyclic prefix correlation and determine if the selected RF carries the desired distribution waveform. Alternatively, the SP_info is used by the handoff logic 130 to acquire desired content on the selected RF channel in an efficient manner.

Thus, the method 800 operates to acquire and utilize SP information associated with RF channels in an MFN for use in aspects of a SP distribution system. It should be noted that the method 800 represents just one implementation and that other implementations are possible within the scope of the aspects.

Figure 9:
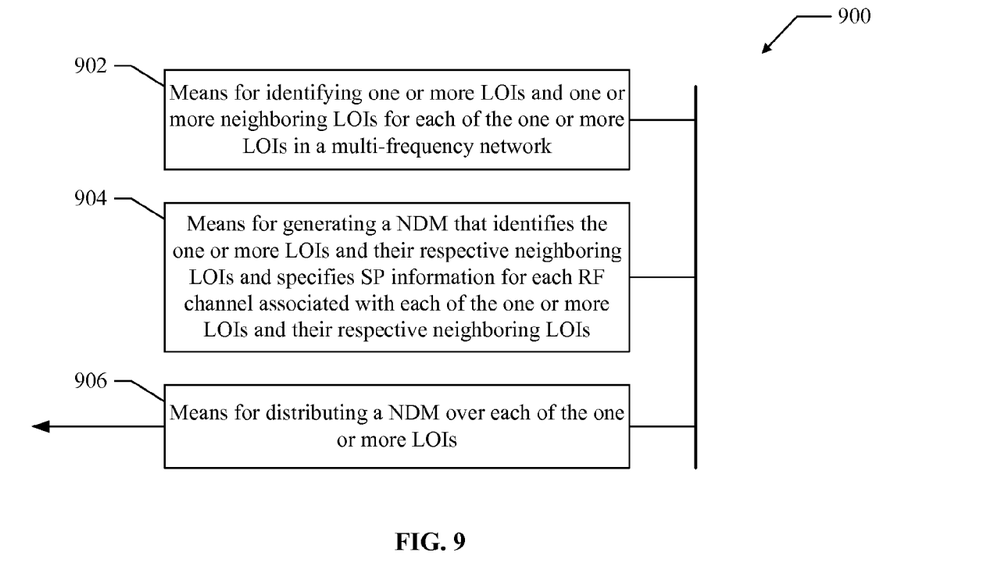
FIG. 9 shows exemplary SP logic for use in aspects of a SP distribution system.

FIG. 9 shows exemplary SP logic 900 for use in aspects of a SP distribution system. For example, the SP logic 900 is suitable for use as the SP logic 300 shown in FIG. 3. In an aspect, the SP logic 900 is implemented by at least one integrated circuit comprising one or more modules configured to provide aspects of a SP distribution system as described herein. For example, in an aspect, each module comprises hardware and/or hardware executing software.

The SP logic 900 comprises a first module (902) for identifying one or more selected local operations infrastructures (LOIs) and one or more neighboring LOIs for each of the one or more selected LOIs in the multi-frequency network, which in an aspect comprises the messaging logic 302. The SP logic 900 also comprises a second module (904) for generating a neighbor description message (NDM) that identifies the one or more selected LOIs and their respective neighboring LOIs and specifies SP information for each radio frequency (RF) channel associated with each of the one or more selected LOIs and their respective neighboring LOIs, which in an aspect comprises the messaging logic 302. The SP logic 900 also comprises a third module (906) for distributing the NDM over each of the one or more selected LOIs, which in an aspect comprises the output logic 308.

Figure 10:
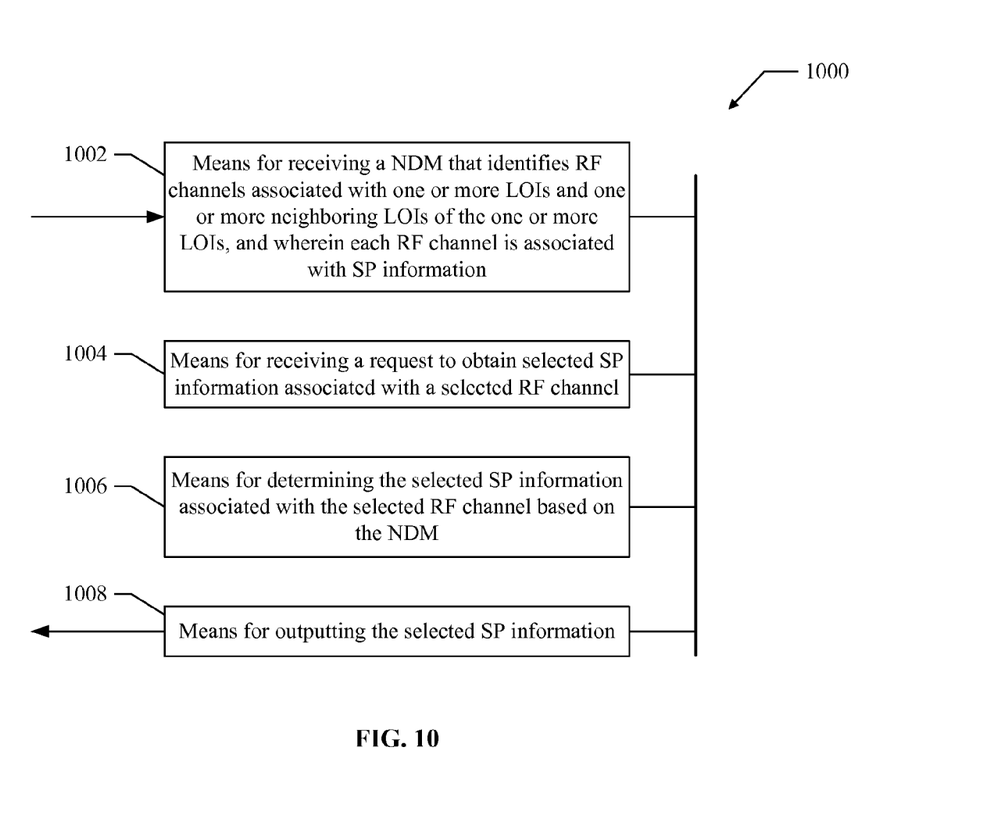
FIG. 10 shows exemplary SP acquisition logic for use in aspects of a SP distribution system.

FIG. 10 shows exemplary SP acquisition logic 1000 for use in aspects of a SP distribution system. For example, the SP acquisition logic 1000 is suitable for use as the SP acquisition logic 700 shown in FIG. 7. In an aspect, the SP acquisition logic 1000 is implemented by at least one integrated circuit comprising one or more modules configured to provide aspects of a SP distribution system as described herein. For example, in an aspect, each module comprises hardware and/or hardware executing software.

The SP acquisition logic 1000 comprises a first module (1002) for receiving a neighbor description message (NDM) that identifies radio frequency (RF) channels associated with one or more local operations infrastructures (LOIs) and one or more neighboring LOIs of the one or more LOIs, and wherein each RF channel is associated with SP information, which in an aspect comprises the control channel input logic 706. The SP acquisition logic 1000 also comprises a second module (1004) for receiving a request to obtain selected SP information associated with a selected RF channel, which in an aspect comprises the processing logic 702. The SP acquisition logic 1000 also comprises a third module (1006) for determining the selected SP information associated with the selected RF channel based on the NDM, which in an aspect comprises the processing logic 702. The SP acquisition logic 1000 also comprises a fourth module (1008) for outputting the selected SP information, which in an aspect comprises the processing logic 702.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CDROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of SP distribution system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for signaling parameter (SP) distribution in a multi-frequency network, the method comprising:

receiving, from a network operations center, a neighbor description message (NDM) that identifies a corresponding local operations infrastructure (LOI) and one or more neighboring LOIs of the corresponding LOI, radio frequency (RF) channels associated with the corresponding LOI and the one or more neighboring LOIs of the corresponding LOI, and wherein each channel is associated with SP information, the SP information associated with each RF channel comprising at least one of a fast Fourier transform (FFT) mode indicator, a pilot pattern indicator, and a cyclic prefix length indicator for the corresponding RF channel;

receiving a request to obtain selected SP information associated with a selected RF channel;

determining the selected SP information associated with the selected RF channel based on the NDM; and outputting the selected SP information.

2. The method of claim 1, wherein said receiving the NDM comprises receiving the NDM over a control channel.

3. The method of claim 1, wherein said receiving the NDM comprises receiving the NDM, wherein the NDM specifies one instance of SP information for all RF channels associated with a selected LOI.

4. The method of claim 1, wherein said receiving the NDM comprises receiving the NDM, wherein the NDM specifies a separate instance of SP information for each RF channel included in the NDM.

5. The method of claim 1, wherein said receiving the NDM comprises receiving the NDM, wherein the NDM specifies a size of the SP information for each RF channel included in the NDM.

6. The method of claim 1, wherein said receiving the request comprises receiving the request to obtain the selected SP information from RF monitoring logic.

7. The method of claim 1, wherein said receiving the request comprises receiving the request to obtain the selected SP information from RF handoff logic.

8. The method of claim 1, further comprising utilizing the selected SP information to determine if the selected RF channel carries a desired distribution waveform for monitoring the selected RF channel.

9. The method of claim 1, further comprising utilizing the selected SP information to receive a desired distribution waveform for acquiring desired content on the selected RF channel.

10. An apparatus for signaling parameter (SP) distribution in a multi-frequency network, the apparatus comprising:

a message decoder configured to receive, from a network operations center, a neighbor description message (NDM) that identifies a corresponding local operations infrastructure (LOI) and one or more neighboring LOIs of the corresponding LOI, radio frequency (RF) channels associated with the corresponding LOI and the one or more neighboring LOIs of the corresponding LOI, and wherein each RF channel is associated with SP information, the SP information associated with each RF channel comprising at least one of a fast Fourier transform (FFT) mode indicator, a pilot pattern indicator, and a cyclic prefix length indicator for the corresponding RF channel; and processing logic configured to:

receive a request to obtain selected SP information associated with a selected RF determine the selected SP information associated with the selected RF channel based on the NDM; and output the selected SP information.

11. The apparatus of claim 10, wherein said message decoder is configured to receive the NDM over a control channel.

12. The apparatus of claim 10, wherein said NDM specifies one instance of SP information for all RF channels associated with a selected LOI.

13. The apparatus of claim 10, wherein said NDM specifies a separate instance of SP information for each RF channel included in the NDM.

14. The apparatus of claim 10, wherein said NDM specifies a size of the SP information for each RF channel included in the NDM.

15. The apparatus of claim 10, wherein said processing logic is configured to receive the request to obtain the selected SP information from RF monitoring logic.

16. The apparatus of claim 10, wherein said processing logic is configured to receive the request to obtain the selected SP information from RF handoff logic.

17. The apparatus of claim 10, wherein said processing logic is configured to utilize the selected SP information to determine if the selected RF channel carries a desired distribution waveform for monitoring the selected RF channel.

18. The apparatus of claim 10, wherein said processing logic is configured to utilize the selected SP information to receive a desired distribution waveform for acquiring desired content on the selected RF channel.

19. An apparatus for signaling parameter (SP) distribution in a multi-frequency network, the apparatus comprising:
means for receiving, from a network operations center, a neighbor description message (NDM) that identifies a corresponding local operations infrastructure (LOI) and one or more neighboring LOIs of the corresponding LOI, radio frequency (RF) channels associated with the corresponding LOI and the one or more neighboring LOIs of the corresponding LOI, and wherein each RF channel is associated with SP information, the SP information associated with each RF channel comprising at least one of a fast Fourier transform (FFT) mode indicator, a pilot pattern indicator, and a cyclic prefix length indicator for the corresponding RF channel;
means for receiving a request to obtain selected SP information associated with a selected RF channel;
means for determining the selected SP information associated with the selected RF channel based on the NDM; and
means for outputting the selected SP information.

20. The apparatus of claim 19, wherein said means for receiving the NDM comprises means for receiving the NDM over a control channel.

21. The apparatus of claim 19, wherein said NDM specifies one instance of SP information for all RF channels associated with a selected LOI.

22. The apparatus of claim 19, wherein said NDM specifies a separate instance of SP information for each RF channel included in the NDM.

23. The apparatus of claim 19, wherein said NDM specifies a size of the SP information for each RF channel included in the NDM.

24. The apparatus of claim 19, wherein said means for receiving the request comprises means for receiving the request to obtain the selected SP information from RF monitoring logic.

25. The apparatus of claim 19, wherein said means for receiving the request comprises means for receiving the request to obtain the selected SP information from RF handoff logic.

26. The apparatus of claim 19, further comprising means for utilizing the selected SP information to determine if the selected RF channel carries a desired distribution waveform for monitoring the selected RF channel.

27. The apparatus of claim 19, further comprising means for utilizing the selected SP information to receive a desired distribution waveform for acquiring desired content on the selected RF channel.

28. A computer program product for signaling parameter (SP) distribution in a multi-frequency network, the computer program product comprising:
a non-transitory machine-readable medium comprising:
a first set of codes for causing a computer to receive, from a network operations center, a neighbor description message (NDM) that identifies a corresponding local operations infrastructure (LOI) and one or more neighboring LOIs of the corresponding LOI, radio frequency (RF) channels associated with the corresponding LOI and the one or more neighboring LOIs of the corresponding LOI, and wherein each RF channel is associated with SP information, the SP information associated with each RF channel comprising at least one of a fast Fourier transform (FFT) mode indicator, a pilot pattern indicator, and a cyclic prefix length indicator for the corresponding RF channel;
a second set of codes for causing the computer to receive a request to obtain selected SP information associated with a selected RF channel;
a third set of codes for causing the computer to determine the selected SP information associated with the selected RF channel based on the NDM; and a fourth set of codes for causing the computer to output the selected SP information.

29. The non-transitory machine-readable medium of claim 28, wherein said first set of codes is configured to cause the computer to receive the NDM over a control channel.

30. The non-transitory machine-readable medium of claim 28, wherein said NDM specifies one instance of SP information for all RF channels associated with a selected LOI.

31. The non-transitory machine-readable medium of claim 28, wherein said NDM specifies a separate instance of SP information for each RF channel included in the NDM.

32. The non-transitory machine-readable medium of claim 28, wherein said NDM specifies a size of the SP information for each RF channel included in the NDM.

33. The non-transitory machine-readable medium of claim 28, wherein said second set of codes is configured to cause the computer to receive the request to obtain the selected SP information from RF monitoring logic.

34. The non-transitory machine-readable medium of claim 28, wherein said second set of codes is configured to cause the computer to receive the request to obtain the selected SP information from RF handoff logic.

35. The non-transitory machine-readable medium of claim 28, further comprising a fifth set of codes for causing the computer to utilize the selected SP information to determine if the selected RF channel carries a desired distribution waveform for monitoring the selected RF channel.

36. The non-transitory machine-readable medium of claim 28, further comprising a fifth set of codes for causing the computer to utilize the selected SP information to receive a desired distribution waveform for acquiring desired content on the selected RF channel.

37. At least one integrated circuit configured for signaling parameter (SP) distribution in a multi-frequency network, the at least one integrated circuit comprising:
a first module configured to receive, from a network operations center, a neighbor description message (NDM) that identifies a corresponding local operations infrastructure (LOI) and one or more neighboring LOIs of the corresponding LOI, radio frequency (RF) channels associated with the corresponding LOI and the one or more neighboring LOIs of the corresponding LOI, and wherein each RF channel is associated with SP information, the SP information associated with each RF channel comprising at least one of a fast Fourier transform (FFT) mode indicator, a pilot pattern indicator, and a cyclic prefix length indicator for the corresponding RF channel;

a second module configured to receive a request to obtain selected SP information associated with a selected RF channel;

a third module configured to determine the selected SP information associated with the selected RF channel based on the NDM; and a fourth module configured to output the selected SP information.

38. The at least one integrated circuit of claim 37, wherein said first module is configured to receive the NDM over a control channel.

39. The at least one integrated circuit of claim 37, wherein said NDM specifies one instance of SP information for all RF channels associated with a selected LOI.

40. The at least one integrated circuit of claim 37, wherein said NDM specifies a separate instance of SP information for each RF channel included in the NDM.

41. The at least one integrated circuit of claim 37, wherein said NDM specifies a size of the SP information for each RF channel included in the NDM.

42. The at least one integrated circuit of claim 37, wherein said second module is configured to receive the request to obtain the selected SP information from RF monitoring logic.

43. The at least one integrated circuit of claim 37, wherein said second module is configured to receive the request to obtain the selected SP information from RF handoff logic.

44. The at least one integrated circuit of claim 37, further comprising a fifth module configured to utilize the selected SP information to determine if the selected RF channel carries a desired distribution waveform for monitoring the selected RF channel.

45. The at least one integrated circuit of claim 37, further comprising a fifth module configured to utilize the selected SP information to receive a desired distribution waveform for acquiring desired content on the selected RF channel.

* * * * *